United States Patent [19]

Tsay

[11] Patent Number: 4,684,032
[45] Date of Patent: Aug. 4, 1987

[54] PORTABLE THERMOS BOTTLE WITH RETRACTABLE SUCTION TUBE

[76] Inventor: Shung-Der Tsay, No. 14, Ta Chang 1st Road, Kaohsiung, Taiwan, 800

[21] Appl. No.: 803,646

[22] Filed: Dec. 2, 1985

[51] Int. Cl.⁴ .................. A47G 21/18; B65D 47/06
[52] U.S. Cl. .................... 215/1 A; 215/13 A; 215/229; 220/90.2; 220/90.6; 222/527; 222/530; 222/538; 229/75; 239/33
[58] Field of Search ............ 215/12 A, 13 A, 1 A, 215/229, 1 R, DIG. 7, 100 R; 220/90.2, 90.4, 90.6, ; 229/75; 224/148; 239/24, 33; 222/74, 527, 530, 538, 539

[56] References Cited

U.S. PATENT DOCUMENTS

| | | | |
|---|---|---|---|
| 1,354,711 | 10/1920 | Altenberg | 215/12 A |
| 2,724,536 | 11/1955 | Pugh, Sr. | 229/75 |
| 3,106,312 | 10/1963 | Hitchcock | 215/1 A |
| 3,362,607 | 1/1968 | Weitzner | 229/75 |
| 3,840,153 | 10/1974 | Devlin | 215/1 A X |
| 4,095,812 | 6/1978 | Rowe | 224/148 X |
| 4,247,016 | 1/1981 | Shaw | 229/75 X |
| 4,252,256 | 2/1981 | Walsh | 215/1 A X |
| 4,274,566 | 6/1981 | Rowe | 224/148 X |
| 4,448,316 | 5/1984 | Hiroshige | 215/1 A |

FOREIGN PATENT DOCUMENTS 776286 10/1934 France .................. 215/DIG. 7

Primary Examiner—Joseph Man-Fu Moy
Assistant Examiner—Sue A. Weaver

[57] ABSTRACT

A portable thermos bottle with retractable suction tube comprising a case, a cup cover, an inner cover with a sliding slot, a slide block capable of sliding up and down on the sliding slot, a spiral reel fitted in the inner cover and having a helical groove, a projecting helical rib, an upper journal and a holed lower journal, two coiled springs fitted on the upper and lower journals, and a flexible sucker having one end coming out of the slide block and another extending through the lower journal hole into the bottle so that it is easier to suck the liquid or beverage in the bottle with the retractable suction tube.

5 Claims, 4 Drawing Figures

PORTABLE THERMOS BOTTLE WITH RETRACTABLE SUCTION TUBE

BACKGROUND AND SUMMARY OF THE INVENTION

Thermos bottles are now widely used indoors and outdoors. To attract customers, thermos bottles are made in a vast array of beautiful shapes and to facilitate the use by users, thermos bottles with a pump were developed. But the suction tube of the latest pump-type thermos bottle is fixed and the user must hold the bottle when pumping, though it is more convenient than pour-type thermos bottle. In view of this, the inventor studied diligently with a quiet mind and developed the portable thermos bottle with retractable suction tube.

The feature of this bottle with a retractable suction tube is that it is very easy to consume the beverage in the bottle only with one hand.

DETAILED DESCRIPTION

Figure 1:
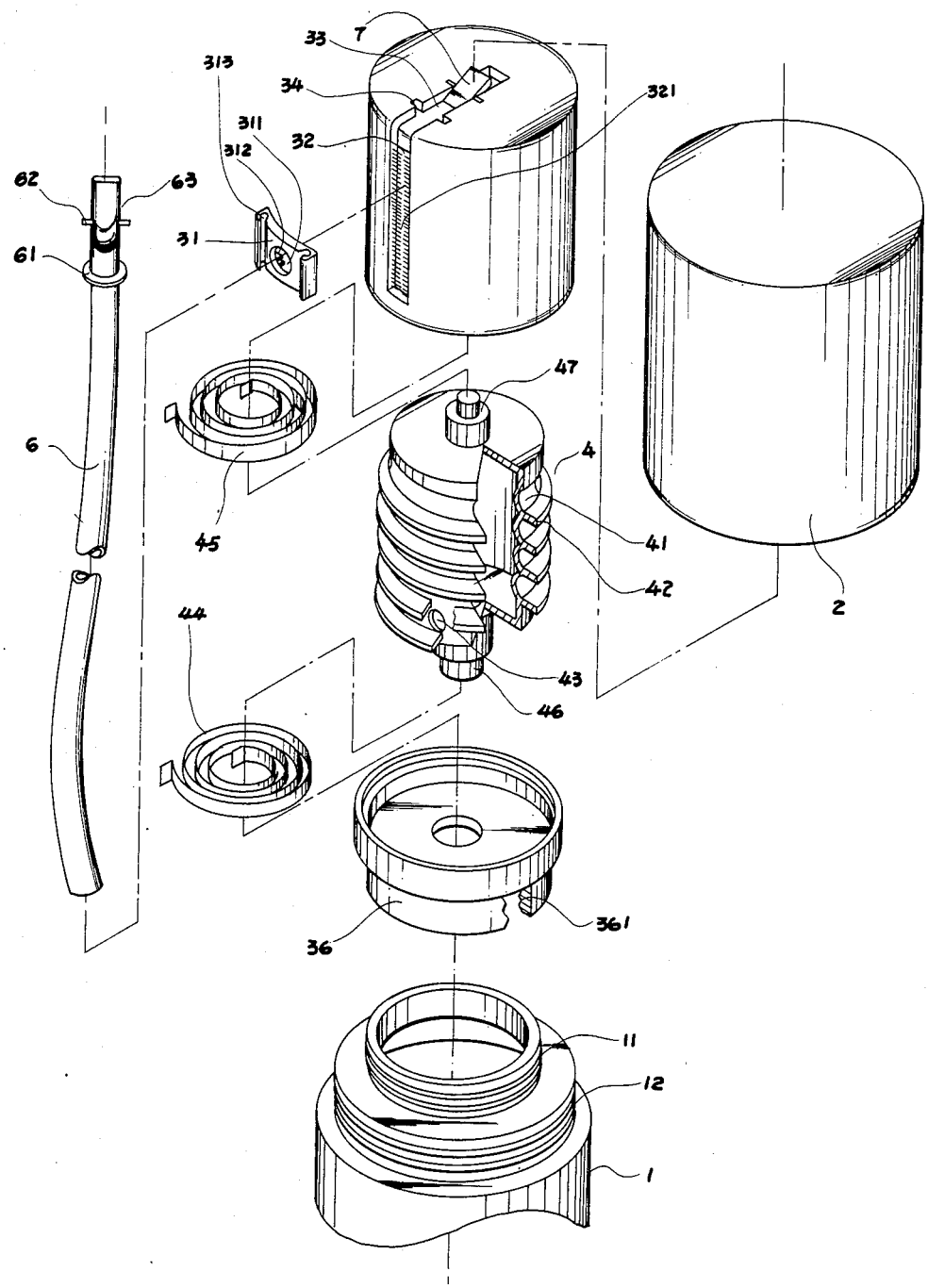
FIG. 1 is an exploded view of the thermos bottle with retractable suction tube of this invention.
Figure 3:
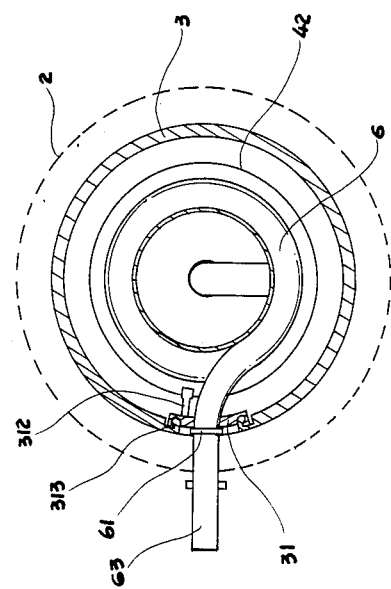
FIG. 3 is a cross section by the B—B line as shown in FIG. 2.
Figure 2:
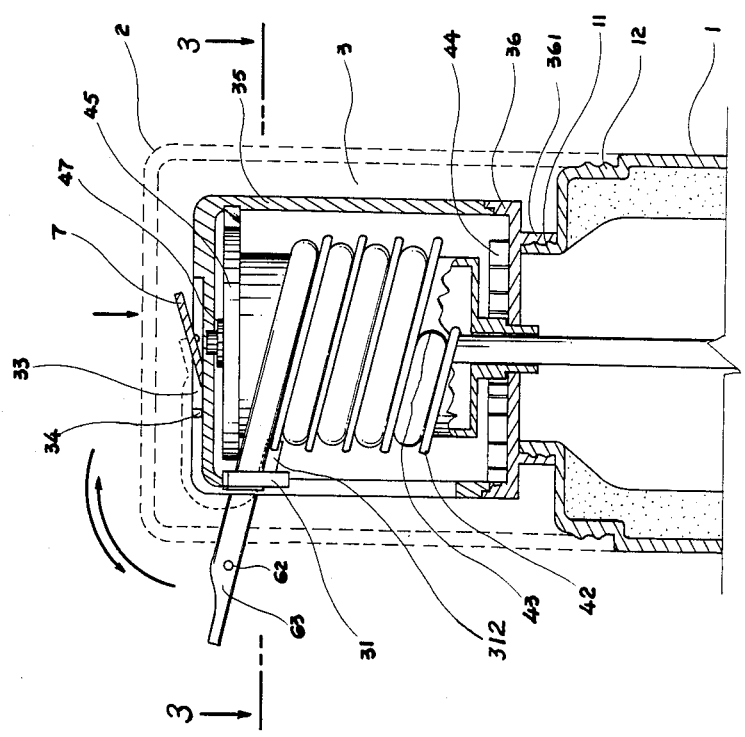
FIG. 2 is a vertical section of the said bottle of this invention.

As shown in FIGS. 1 & 2, the case 1 (shaped like that of a later conventional thermos bottle) has stepped, threaded parts 11, 12 for the engaging thread cup cover 2 and the inner cover 3. The inner cover 3 consists of two parts 35, 36. The upper part 35 has a vertical slide slot 32 connecting to the catch slot 33 on the top and used for the slide block 31 having a tube hole 311, a wedge pin 312 and two sliding grooves 313 to slide up and down freely. The slide slot 32 is covered with a flexible guard 321. The catch slot 33 on the top has a cross slot 34 for the end 63 of the flexible tube 6 to snap in and a seesaw type pryer 7 for prying the end 63 of the flexible tube 6 off the catch slot 33 without need to pry with finger so as to keep the tube end 63 clean. The lower part 36 of the inner cover 3 has internal thread 361 for screwing on the threaded part 11 of the case 1. A spiral reel 4 fitted in the upper and lower parts 35, 36 of the inner cover 3 has helical groove 41 and projecting helical rib 42. In the helical groove 41 the wedge pin 312 of the slide block 31 is fitted so that the slide block 31 can slide up and down along the slide slot 32. The spiral reel 4 also has upper and lower journals 47, 46 at the top and bottom ends. The lower journal 46 is slidably fitted in the central hole of the lower part 36 of the inner cover 3 and has a hole in the center. At the lower end of the helical groove 41 a hole 43 is provided for the flexible tube 6 to fit in. Two coiled springs 45, 44 are fitted respectively on the upper and lower journals 47, 46 so that the spiral reel 4 will rotate with the unwinding of the coiled springs 45, 44.

The flexible tube 6 has a retaining collar 61 and two retaining lugs 62 at the outlet end 63 to snap into the tube hole 311 of the slide block 31 and the catch slot 33 so as to facilitate the outlet end 63 to remove from and pack in the catch slot 33.

As shown in FIG. 2, the flexible tube 6 is wound on the helical groove 41 and projecting helical rib 42 of the spiral reel 4 and extends through the hole 43 at the lower end of the helical groove 41, and through the central hole in the lower journal 46 into the bottle. The outlet end 63 of the flexible tube 6 comes out of the hole 311 of the slide block 31 and can be snapped in the catch slot 33 and rest on the pryer 7 when the cup cover 2 is put on (or not). When the pryer 7 is pressed down, the tube end 63 will be pryed off the catch slot 33 ready for sucking liquid from the bottle.

Figure 4:
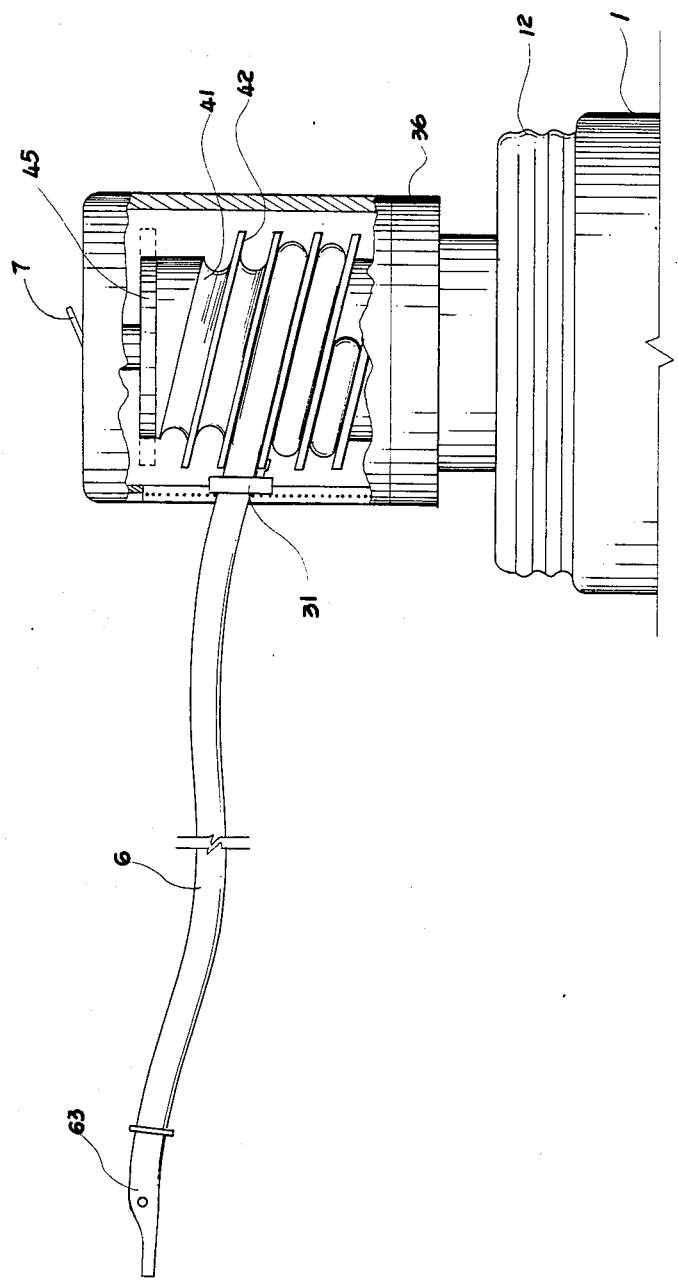
FIG. 4 illustrates the use of the retractable suction tube of this invention.

As shown in FIG. 4 the tube 6 can be drawn out for sucking by holding the suction end 63 with one hand without need to hold the case 1 with another hand. With the increase of length of the flexible tube 6 drawn out the slide block 31 lowers and the force of return of the coiled springs 44, 45 becomes greater. The slide block 31 has a stop (not shown) to prevent the flexible tube 6 from retracting when the tube 6 is unwound to a certain extent. If the flexible tube 6 is pulled slightly and released after use, the coiled springs 44, 45 will be released and the flexible tube 6 will retract automatically with the rotating of the spiral reel 4. (At this time the slide block 31 will be raised.) So it is retractable and convenient for use.

I claim:

1. A portable thermos bottle with retractable suction tube comprising a case with stepped, threaded parts, a cup cover, an inner cover, a spiral reel and a flexible tube; said spiral reel having helical groove and projecting helical rib; said helical groove having a tube hole at the lower end; said spiral reel having upper and lower journals fitted within the inner cover and equipped with coiled springs; said inner cover consisting of an upper part and a lower part; said upper part of the inner cover having a catch slot and a sliding slot on which a slide block is slidably fitted; said flexible tube being wound on said spiral reel and having one end fitted in the bottle and another coming out of the slide block so that the flexible tube is retractable.

2. A portable thermos bottle according to claim 1 wherein the lower part of the inner cover has internal threads for screwing on to the case of the thermos bottle.

3. A portable thermos bottle according to claim 1 wherein the flexible tube has a retaining collar and two lugs.

4. A portable thermos bottle according to claim 1 wherein the slide block slidably fitted on the sliding slot of the inner cover, has a hole and a wedge pin fitted on the helical rib of the spiral reel so that the slide block will move up and down with the rotating of the spiral reel.

5. A portable thermos bottle according to claim 3 wherein the catch slot of the inner cover has a cross catch slot for the lugs of the flexible tube to snap in, and a prier to pry the tube end off the catch slot.